United States Patent [19]

Hudson, Jr.

[11] 3,888,936

[45] June 10, 1975

[54] REMOVAL OF FREE RADICAL INHIBITORS TO PROMOTE SYNTHESIS OF ALPHA, OMEGA-DICHLOROALKANE TELOMERS FROM ETHYLENE AND SULFURYL CHLORIDE

[75] Inventor: Joseph A. Hudson, Jr., Waco, Tex.

[73] Assignee: Continental Oil Company, Ponca City, Okla.

[22] Filed: Jan. 19, 1973

[21] Appl. No.: 324,901

Related U.S. Application Data

[62] Division of Ser. No. 233,321, March 9, 1972.

[52] U.S. Cl............................................. 260/659 R
[51] Int. Cl............................................. C07c 17/02
[58] Field of Search..................... 260/659 R, 658 C

[56] References Cited

UNITED STATES PATENTS

| | | | |
|---|---|---|---|
| 1,235,283 | 7/1917 | Brooks et al.................... | 260/659 R |
| 2,440,800 | 5/1948 | Hanford et al.................. | 260/658 C |
| 3,142,708 | 7/1964 | Young............................. | 260/659 R |
| 3,631,115 | 12/1971 | Nakagawa et al............... | 260/658 C |

*Primary Examiner*—Delbert E. Gantz
*Assistant Examiner*—Joseph A. Boska
*Attorney, Agent, or Firm*—Bayless E. Rutherford, Jr.

[57] ABSTRACT

In the synthesis of alpha,omega-dichloroalkanes such as 1,2-dichlorobutane and 1,6-dichlorohexane from ethylene and sulfuryl chloride, yield is improved when the reaction environment is scrupulously rendered and maintained free from Lewis acids and other free radical inhibiting materials.

1 Claim, No Drawings

REMOVAL OF FREE RADICAL INHIBITORS TO PROMOTE SYNTHESIS OF ALPHA, OMEGA-DICHLOROALKANE TELOMERS FROM ETHYLENE AND SULFURYL CHLORIDE

This is a division of application Ser. No. 233,321, filed Mar. 9, 1972.

BACKGROUND OF THE INVENTION

This invention relates to an improvement in the process for telomerization of ethylene and sulfuryl chloride to alpha,omega-dichloroalkanes wherein conversion and yield of the higher alpha,omega-dichloroalkanes is improved.

Telomerization reactions wherein a taxogen such as ethylene is reacted with a telogen such as sulfuryl chloride ($SO_2Cl_2$) to form a telomer such as an alpha,omega-dichloroalkane have been known for many years (U.S. Pat. No. 2,440,800, Hanford et al). More recently, it has been disclosed by U.S. Pat. No. 3,142,708, Young et al., that alpha,omega-dihaloalkanes can be prepared by reacting ethylene with a sulfuryl halide in the presence of a free radical forming agent such as an organic peroxide or any other well-known free radical forming initiator at a temperature of about 100°–300°C and a pressure of from 1,000 psig to 30,000 psig. It is further disclosed that such a reaction can be carried out in the presence of a diluent or solvent which is inert under the conditions of the reaction such as tetrachloroethylene, dichloromethane, 1,2-dichloroethane, or trichlorobenzene. Such inventions constituted considerable advances in the art.

More recently, in the pending application Ser. No. 215,912 of Starks and Hudson, filed on Jan. 3, 1972, it was disclosed that in the synthesis of alpha,omega-dichloroalkanes such as 1,2-dichlorobutane and 1,6-dichlorohexane from ethylene and sulfuryl chloride, selectivity to the higher alpha,omega-dichloroalkanes is improved and lower ethylene pressures can be employed when benzene or chlorobenzene is employed as a chlorine complexing solvent.

However, a need still exists for improvement whereby the yield of alpha,omega-dichloroalkanes is improved. Any improvement in such a telomerization process by which yields of higher alpha,omega-dichloroalkanes are improved constitutes a significant and substantial advance in the art.

OBJECTS OF THE INVENTION

An object of the invention is to provide an improved process for the production of alpha,omega-dichloroalkanes.

This and other objects and advantages will appear from the following description of the embodiments of the invention, and the most novel features will be particularly pointed out hereinafter in connection with the appended claims.

SUMMARY OF THE INVENTION

In one aspect, this invention relates to an improvement in the synthesis of alpha,omega-dichloroalkane telomers wherein free radical inhibiting materials, in particular, Lewis acids, are substantially completely excluded from the reaction environment.

DESCRIPTION OF THE PREFERRED EMBODIMENTS

According to the instant invention, the reaction environment wherein sulfuryl chloride and ethylene are converted to alpha,omega-dichloroalkane telomers is substantially completely free from a free radical inhibitor.

The telomerization reaction whereby ethylene and sulfuryl chloride are converted to alpha,omega-dichloroalkane telomers is represented as follows:

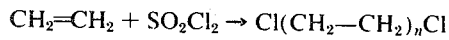

$$CH_2=CH_2 + SO_2Cl_2 \rightarrow Cl(CH_2-CH_2)_nCl$$

wherein $n$ is an integer in the range of 1 to about 4.

According to the improvement in the telomerization process of this invention, the reaction environment of the telomerization conversion is rendered and maintained substantially completely free from a free radical inhibiting material. Such free radical inhibiting materials include the Lewis acids. A Lewis acid is defined as an electron acceptor. Examples of some Lewis acids include: ferric chloride, aluminum chloride, cupric chloride, zinc chloride, chromic chloride, stannic chloride, and their oxides or other salts which can react with sulfuryl chloride in the reaction environment. Free radical inhibitors other than Lewis acids which are contemplated include: oxygen, olefins other than ethylene, aliphatic hydrocarbons or ethers, alcohols and similar compounds, arylalkyl compounds, and compounds containing iodine.

It is particularly desirous that the reaction environment be substantially completely free from oxygen.

One presently particularly preferred means of rendering and maintaining the reaction environment substantially completely free from free radical inhibitors is to charge purified reactants to a reactor which has been thoroughly purged with an inert gas. The reactants can be purified by any conventional means of purifying such materials including distillation, contact with solvents, contact with reactants which will convert the free radical inhibitors to noninhibiting materials, purging with inert gas, and the like. The reactor apparatus can be purged of free radical inhibitors by passing therethrough an inert gas such as neon, argon, helium, nitrogen, methane, perhalogenated alkanes, and the like. The equipment can also be washed with dilute acids (such as HCl) to remove rust and scale, then dried under an inert gas such as nitrogen.

Temperatures in the range of 100° to 300°C are suitable for the telomerization reaction of the instant invention. At temperatures below about 100°C, the rate of reaction is not generally feasible, and solid materials are formed. At temperatures above about 300°C, decomposition problems become serious, and excessive pressures must be employed to maintain the reactants in sufficient concentration in the reaction environment. Preferably, temperatures in the range of about 180° to 230°C are most suitably employed.

Pressures sufficient to maintain sufficient quantities of reactants in the reaction environment must be employed. Elevated pressures of as high as about 30,000 psig can be employed. In general, pressures in the range of about 500 psig to 10,000 psig are most suitable for optimum results. However, pressures in the range of 100 psig to 30,000 psig are normally satisfactory.

A chlorine complexing solvent can be employed according to this invention if desired. Examples of suitable chlorine complexing solvents include benzene and chlorobenzene. Mixtures can be employed if desired. An effective amount, that is, an amount of chlorine complexing solvent sufficient to cause a measurable shift in selectivity toward the higher alpha,omega-dichloroalkane products is employed as a minimum if chlorine complexing solvents are employed. The only limit on the maximum amount of chlorine complexing solvent which is employed is one of feasibility, that is, the sulfuryl chloride and ethylene should not be so diluted in the reaction environment that the rate of reaction therebetween becomes nonfeasible. The chlorine complexing solvent is often employed in amounts such that about 10 to 95 weight percent of the reaction environment is made up of the chlorine complexing solvent. Preferably, 40 to 90 weight percent of the reaction environment is chlorine complexing solvent when such is employed. The conversion of the instant invention can also be effected in the absence of the chlorine complexing solvent if desired. However, a chlorine complexing solvent is often advantageously employed in that good selectivities to higher telomers can be obtained with lower pressures with resulting savings in equipment outlay.

A reaction time sufficient to effect the degree of conversion desired is employed. Reaction times in the range of about 5 seconds to 10 minutes are often suitable.

A chemical free radical initiator can be employed to promote the telomerization of ethylene and sulfuryl chloride to alpha,omega-dichloroalkane telomers if desired. Any chemical free radical forming initiator known to the prior art to form free radicals can be employed. Some suitable chemical free radical initiators include organic peroxides such as benzoyl peroxide, acetyl peroxide, t-butyl peroxide, t-butyl peracetate, ethyl peroxide, t-butyl perbenzoate, succinic peroxide, diisopropyl percarbonate, and the like, as well as azobisisobutyronitrile, triphenylchloromethane, triethyl lead, and the like. The reaction can be thermally initiated if desired. Other free radical initiating means such as radiation can also be employed. The improvement of the instant invention wherein the reaction environment is maintained substantially completely free of free radical inhibiting materials has most advantageous application when the telomerization reaction is thermally initiated.

A ratio of about 1 to 1,000 moles of ethylene per mole of sulfuryl chloride can be employed. A preferred ratio is about 10 to 50 moles of ethylene per mole of sulfuryl chloride. When a chemical free radical initiating means is employed, about 0.0001 to 0.10 moles of chemical free radical forming initiator per mole of sulfuryl chloride is often suitable. However, as stated previously, the improvement of the instant invention is particularly advantageous when the reaction is thermally initiated.

It is also within the scope of this invention to employ an inert diluent or solvent concurrently with the chlorine complexing solvent when a chlorine complexing solvent is employed.

The telomers produced according to the improved process of this invention can be separated from each other, from any chlorine complexing present, and from other materials present by any means known to the art for separation of organic chemicals. For example, fractional distillation, fractional crystallization, selective solvents, chromatography, and the like can be employed.

The following examples are presented so that the improved process of the invention may be more readily understood. These examples should not be interpreted to limit the invention in any manner.

EXAMPLE 1

To a 250 ml stainless steel reactor was charged 12.4 g of benzene. A solution composed of 14.1 g of sulfuryl chloride in 10.7 g of benzene was prepared. The entire reactor system was thoroughly flushed with nitrogen gas to free the environment of oxygen. The reactor containing benzene was heated to 240°C, and then pressured to 825 psig with ethylene. The solution of sulfuryl chloride and benzene at about 25°C was then charged to the reactor at a rate of about 0.4 ml per minute. Upon completion of addition, the reactor temperature was maintained at 245°C for about 1 hour, and then cooled. The reaction mixture was analyzed by gas chromatography and determined to contain 3.83 g of ethylene chloride, 0.71 g of 1,4-dichlorobutane, 0.29 g of 1,6-dichlorohexane, and trace amounts of higher alpha,omega-dichloroalkanes. Conversion of sulfuryl chloride to alpha,omega-dichloroalkanes was about 30 mole percent, and selectivity was greater than 90 mole percent.

Longer periods of heating are determined to result in even greater conversion of reactants.

A control run wherein the free radical inhibitor, oxygen, is not scrupulously excluded from the reaction environment results in practically no conversion to alpha,omega-dichloroalkanes.

This example demonstrates that improved yields of alpha,omega-dichloroalkane telomers are produced from the telomerization of ethylene and sulfuryl chloride when the reaction environment is maintained substantially completely free from a free radical inhibitor. This example further demonstrates that such telomerization reactions to produce good yields of alpha,omega-dichloroalkanes can be effected without the necessity of employing expensive chemical free radical initiators or without the expense of special reactors for the use of radiation such as actinic light.

I claim:

1. In a process for the telomerization of ethylene and sulfuryl chloride to form alpha,omega-dichloroalkanes wherein the telomerization is conducted at a temperature of 100°–300°C and at a pressure of 100 to 30,000 psig, the improvement comprising conducting the telomerization in a reaction environment which is previously rendered free from oxygen and initiating it thermally.

* * * * *